Oct. 1, 1963  G. K. KOCHER  3,105,785
PUNCTURE RESISTANT PNEUMATIC TIRE
Filed Aug. 29, 1961

INVENTOR.
GEORGE K. KOCHER
BY
Oldham & Oldham
ATTYS.

3,105,785
PUNCTURE RESISTANT PNEUMATIC TIRE
George K. Kocher, 604 Elmira St., White Haven, Pa.
Filed Aug. 29, 1961, Ser. No. 134,747
1 Claim. (Cl. 156—128)

This invention relates to pneumatic tires, and, more particularly, is concerned with puncture resistant pneumatic tires.

It is the general object of the invention to provide a relatively simple, inexpensive, long-wearing pneumatic tire characterized by puncture resistance to sharp objects, such as nails or glass, and without sacrifice of flexibility.

Another object of the invention is the provision of a pneumatic tire of the type described wherein a layer of metallic powder or particles, or a plurality of layers, appropriately impregnated with rubber-like material, is positioned between the tire carcass and the tire tread, and suitably vulcanized to both the carcass and tread.

Another object of the invention is to utilize a metallic layer, as set forth, in which the metallic particle size is selected within a given range, and from the group including iron, steel, stainless steel, and metallic oxides, such as artificial or natural Carborundum.

The foregoing objects of the invention, and other objects which will become apparent as the description proceeds, are achieved by the provision of a pneumatic tire having a carcass of a plurality of plies of rubberized fabric, a tread on the carcass of rubber-like material, and at least one layer of rubberized metallic particles interposed between the carcass and the tread and composed of metallic particles having a size between about 4 mesh and about 100 mesh, the particles being substantially in engagement with each other and the voids between the particles being filled with rubber-like material which is vulcanized to the carcass and the tread.

For a better understanding of the invention reference should be had to the accompanying drawings wherein.

Figure 1:
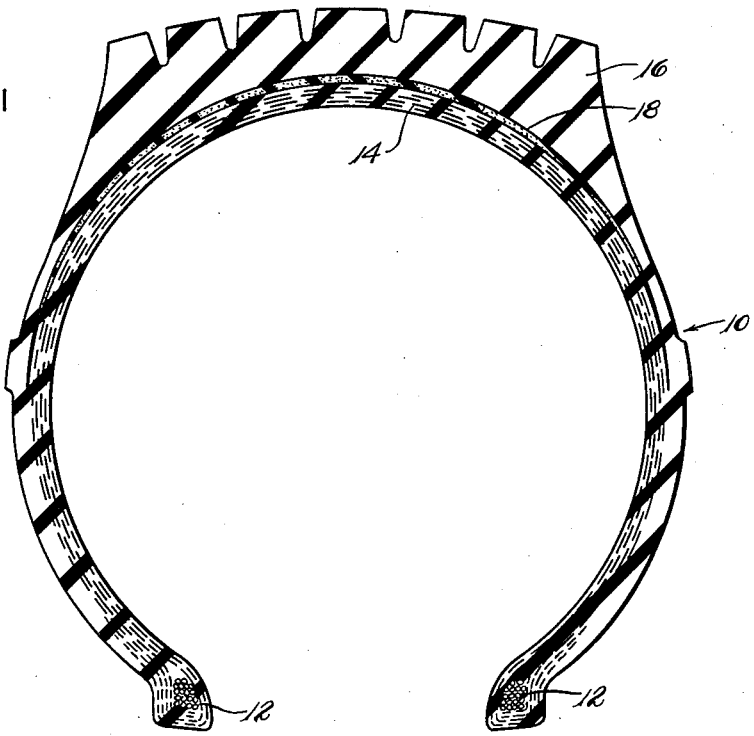
FIG. 1 is a cross section through a pneumatic tire incorporating the invention.

In the drawings, the numeral 10 indicates generally a pneumatic tire shown to be of the straight sided type having endless inextensible beads 12, a carcass 14 formed of a plurality of plies of rubberized fabric, and a tread 16 of rubber-like material, all of known or conventional construction. The term "rubberized" or "rubber-like," and the like, as utilized in the specification and claim is intended to cover natural and synthetic rubbers, and other rubber-like materials conventionally employed in pneumatic tire construction.

Interposed between the tire carcass 14 and the tread 16 is a layer, or a plurality of layers 18 of metallic powder or particles appropriately impregnated or bound together by rubberized or rubber-like material so that in the vulcanization of the complete tire the layer 18 or the plurality of layers 18 are firmly vulcanized to both the carcass 14 and the tread 16, and to each other, in the event of a plurality of layers, whereby an integral tire assembly is provided.

Figure 2:
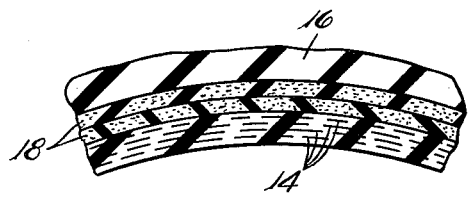
FIG. 2 is an enlarged fragmentary view, still in cross section, of a portion of FIG. 1, and better illustrating the positioning of the metallic particle layers between the carcass and tire tread.

FIG. 2 illustrates on somewhat larger scale a portion of the tire carcass 16, a pair of layers 18 containing the metal powder or particles, and four layers of rubberized fabric forming the tire carcass 14.

Figure 3:
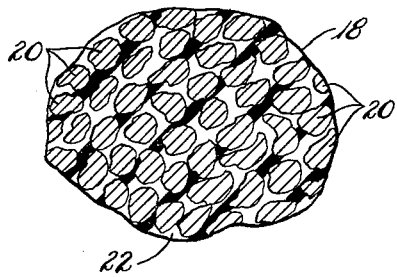
FIG. 3 is an enlarged fragmentary view, still in cross section, of a portion of one of the metallic layers shown in FIG. 2, and better illustrating the construction of the layer.

FIG. 3 still more completely illustrates in a cross-sectional view which has been considerably enlarged, the structure of one of the metallized powder or particle layers 18, individual metallic particles being indicated by the numeral 20, with the voids between these particles being filled with the rubberized or rubber-like material 22. Upon vulcanization the material 22 not only substantially fully surrounds and supports the individual metallic particles 20, but, in addition, serves to vulcanize each layer 18 appropriately to the tire carcass 14, the tread 16, or to an adjacent layer 18.

As to particle size, metallic powders or particles passing between about a 4 mesh and about a 100 mesh screen are utilized, and in the preferred practice of the invention the particle size is between about 10 mesh and about 40 mesh.

The metallic particles are selected from the group including iron, steel, stainless steel, and aluminum oxide, including both artificial and natural Carborundum. Sometimes mixtures of these materials can be utilized, for example, in one embodiment of the invention a mixture of stainless steel grindings and grinding wheel bits was employed as this material fell from a grinding wheel grinding stainless steel. The metallic powders or particles are normally relatively hard so that they act to turn aside or to prevent the penetration of a tack, nail, other piece of metal, or glass during the normal use of the pneumatic tire to thereby provide the puncture resistant characteristics of the pneumatic tire of the invention.

During the actual fabrication of the tire, the carcass 14 is built in conventional manner, and over the carcass is placed a layer of the rubberized or rubber-like material 22 which bonds or impregnates the metal particles 20. Thereafter, the metallic particles are normally sprayed against the soft and tacky material 22 to form an appropriate layer, and thereafter, an additional amount of the rubberized or rubber-like material 22 is applied on the outer surface of the metal particles. One or more layers of the metal powder or particles 18 is thus built up on the tire carcass, followed by the application of the tread 16 in conventional manner, in turn followed by the shaping of the tire and the vulcanization thereof to form the complete tire assembly.

The resulting pneumatic tire retains substantially all of its characteristics of flexibility and normal function and operation, but possesses good characteristics of puncture resistance.

While a certain representative embodiment and details have been shown for the purpose of illustrating the invention, it will be apparent to those skilled in this art that various changes and modifications may be made therein without departing from the spirit or scope of the invention.

What is claimed is:

A method of making a puncture resistant pneumatic tire comprising the steps of sequentially placing a plurality of layers of soft and tacky rubberized material over the outer surface of the tire carcass, said layers being narrower than the carcass, spraying the entire outer surface of each layer of said rubberized material with minute metallic particles in a spray quantity that causes each metallic particle to be substantially isolated with the tacky rubberized material substantially surrounding each particle, applying the tire tread over the layers of soft and tacky rubberized material containing minute metallic particles, said tread being wider than the metallic layers shaping the tire, and vulcanizing the tire to form a complete assembly, said vulcanizing process also vulcanizing the rubberized metallic layers to the tread and to the carcass.

(References on following page)

References Cited in the file of this patent

UNITED STATES PATENTS

| | | |
|---|---|---|
| 780,519 | Mitchell et al. | Jan. 24, 1905 |
| 1,330,988 | Sayre | Feb. 17, 1920 |
| 1,412,744 | Hobson et al. | Apr. 11, 1922 |
| 2,521,305 | Olson | Sept. 5, 1950 |
| 2,672,910 | Corson | Mar. 23, 1954 |
| 2,675,047 | Andy | Apr. 13, 1954 |
| 2,766,800 | Rockoff | Oct. 16, 1956 |
| 2,980,161 | Howard | Apr. 18, 1961 |
| 2,995,178 | Saulino et al. | Aug. 8, 1961 |